(12) United States Patent  
Kim (10) Patent No.: US 12,136,301 B2
(45) Date of Patent: Nov. 5, 2024

(54) METHOD OF DIAGNOSING JUDDER DETECTION MODULE

(71) Applicants: HYUNDAI MOTOR COMPANY, Seoul (KR); KIA CORPORATION, Seoul (KR)

(72) Inventor: Sun Joo Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 398 days.

(21) Appl. No.: 17/546,394

(22) Filed: Dec. 9, 2021

(65) Prior Publication Data

US 2023/0005306 A1     Jan. 5, 2023

(30) Foreign Application Priority Data

Jun. 30, 2021   (KR) .................. 10-2021-0085486

(51) Int. Cl.
  *G07C 5/08*     (2006.01)
  *B60T 8/17*     (2006.01)
  *B60W 50/16*    (2020.01)
  *B62D 5/04*     (2006.01)

(52) U.S. Cl.
  CPC ............. *G07C 5/0808* (2013.01); *B60T 8/17* (2013.01); *B60W 50/16* (2013.01); *B62D 5/0463* (2013.01)

(58) Field of Classification Search
  CPC ....... G07C 5/0808; G07C 5/0825; B60T 8/17; B60T 2270/406; B60T 17/221; B60T 7/04; B60T 8/4018; B60T 8/4068; B60T 2250/04; B60T 17/22; B60T 8/92; B60T 8/90; B60T 13/02; B60T 13/74; B60W 50/16; B60W 50/0205; B62D 5/0463; B62D 5/0481; B62D 5/0472; B62D 5/046; Y02T 10/72; B60L 15/2009; G01M 7/00–08; G01M 17/00–10
  See application file for complete search history.

(56) References Cited

U.S. PATENT DOCUMENTS

| | | | | |
|---|---|---|---|---|
| 5,491,631 | A * | 2/1996 | Shirane | F02M 26/49 |
| | | | | 701/33.9 |
| 8,267,220 | B2 * | 9/2012 | Sugiyama | B62D 5/0463 |
| | | | | 180/443 |
| 9,994,226 | B2 * | 6/2018 | Dudar | B60W 30/20 |
| 10,328,944 | B2 * | 6/2019 | Dudar | F02D 41/1498 |
| 10,464,408 | B2 * | 11/2019 | Dudar | B60W 10/06 |
| 11,016,002 | B2 * | 5/2021 | Wheeler | G01M 17/007 |

(Continued)

FOREIGN PATENT DOCUMENTS

| KR | 10-2005-0069723 A | | 7/2005 |
|---|---|---|---|
| KR | 20030045427 A | * | 6/2006 |
| KR | 20150072022 A | * | 6/2015 |

*Primary Examiner* — Judy Nguyen
*Assistant Examiner* — James Split
(74) *Attorney, Agent, or Firm* — Morgan, Lewis & Bockius LLP (57) ABSTRACT

A method for diagnosing whether or not a judder detection module mounted on a vehicle is operating normally includes receiving a diagnosis request requesting that the judder detection module of the vehicle be diagnosed; preparing for an execution environment for diagnosis of the judder detection module; activating the judder detection module; forcibly generating judder in the vehicle; and determining whether or not the judder detection module operates.

12 Claims, 10 Drawing Sheets

(56) References Cited

U.S. PATENT DOCUMENTS

2018/0178657 A1* 6/2018 Moriya .................. B60L 3/108
2019/0389443 A1* 12/2019 Foitzik ................. B60T 17/221
2021/0213927 A1 7/2021 Kim et al.

* cited by examiner

METHOD OF DIAGNOSING JUDDER DETECTION MODULE

CROSS REFERENCE TO RELATED APPLICATION

The present application claims the benefit of priority to Korean Patent Application No. 10-2021-0085486, filed on Jun. 30, 2021, in the Korean Intellectual Property Office, the entire contents of which are incorporated herein for all purposes by reference.

BACKGROUND

Technical Field

The present disclosure relates generally to a method of diagnosing a judder detection module and, more particularly, to a judder detection module diagnosing method for diagnosing whether or not a judder detection module mounted on a vehicle is operating normally.

Description of the Related Art

Brake judder occurring during braking of a vehicle refers to a phenomenon where the vehicle body vibrates, or vibrations or noise are generated from the brake pedal, the steering wheel, or the like when the brake is being pressed. It is known that the brake judder is mainly caused by the thermal deformation or the thickness deviation of the brake disc.

When the thermal deformation or the thickness deviation of the brake disc arises, the difference in the coefficient of friction between the brake disc and a friction material causes a change in the braking torque of the disc. This change vibrates the wheel. Such vibration occurring in the wheel is transferred to the steering wheel through the suspension and the steering unit.

Methods of determining judder may include a method of determining whether or not judder actually occurs by repeatedly braking a vehicle in a high-speed driving condition, a method of directly measuring a difference in the thickness of the brake disc, a method of using a dynamo, and the like. However, none of these methods may be regarded as being significantly efficient, due to time and costs required for performing the methods.

Recently, in place of these methods, a judder detection logic is mounted on a vehicle to detect judder and store information regarding the occurrence of the judder. Thus, a repair shop or a service center may easily determine the amount of judder using a detector. However, as a problem of the judder detection logic, it is difficult to determine whether or not the judder detection logic is operating normally.

For example, in situations, such as where no judder has occurred in a vehicle on which the judder detection logic is mounted (that is, even when the judder detection logic is operating normally, it is impossible to determine whether or not the judder detection logic is operating normally unless judder has occurred) and where the judder detection logic is not operating normally due to a problem, such as a logical error or a system defect, or the like, it is impossible to determine whether or not the judder detection logic actually is operating normally.

In addition, data regarding the operation of the detection logic is helpful in providing relevant information to a user. There may be a situation in which a vehicle owner has brought his/her vehicle to a service center for testing because of a judder problem, but no judder is detected by a detection logic. In this case, when reporting to the vehicle owner that no judder is detected, it would be more reliable that actual data regarding the judder detection is provided.

Therefore, there is a demand for the development of a technology that can make it possible to diagnose whether or not a judder detection function is operating normally.

The information disclosed in the Background section above is to aid in the understanding of the background of the present disclosure, and should not be taken as acknowledgement that this information forms any part of prior art.

SUMMARY

Accordingly, the present disclosure has been made keeping in mind the above problems occurring in the related art, and the present disclosure is intended to propose a method and system for diagnosing whether or not a judder detection module mounted on a vehicle is operating normally.

The objective of the present disclosure is not limited to the aforementioned description, and other objectives not explicitly disclosed herein will be clearly understood by a person having ordinary skill in the field to which the present disclosure pertains (hereinafter, referred to as a "person having ordinary skill in the art") from the description provided hereinafter.

In order to achieve at least one of the above objectives and perform at least one of characteristic functions of the present disclosure to be described later, the present disclosure has following features.

According to one aspect of the present disclosure, provided is a method of diagnosing a judder detection module. The method may include: receiving a diagnosis request requesting that a judder detection module of a vehicle be diagnosed; preparing for an execution environment for diagnosis of the judder detection module; activating the judder detection module; forcibly generating judder in the vehicle; and determining whether the judder detection module operates.

According to one exemplary embodiment of the present disclosure, the method and system for diagnosing a judder detection module may diagnose whether or not the judder detection module mounted on a vehicle is operating normally.

The effects of the present disclosure are not limited to the aforementioned description, and other effects not explicitly disclosed herein will be clearly understood by a person having ordinary skill in the art from the description provided hereinafter.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

In particular, an objective of the present disclosure is to diagnose whether or not a judder detection module mounted on a vehicle to detect judder in the vehicle is operating normally.

The present disclosure is related to a technology that can prevent over-repairs. Specifically, the technology according to one exemplary embodiment of the present disclosure can make it possible to detect and record judders occurring on the steering wheel, the brake pedal, or a combination thereof during braking and, on the basis of the result of the detection, determine whether or not judder-related repair is necessary. However, according to this judder detection technology, it is difficult to determine whether or not judder detection is carried out normally. That is, means for diagnosing whether or not a judder detection logic is operating normally are limited.

A system for diagnosing a judder detection module according to one exemplary embodiment of the present disclosure is configured to determine whether or not the judder detection module is operating normally by forcibly generating judder in a vehicle and monitoring whether or not the judder detection module detects the forcibly-generated judder.

Hereinafter, the present disclosure will be described in detail with reference to the accompanying drawings.

Figure 1:
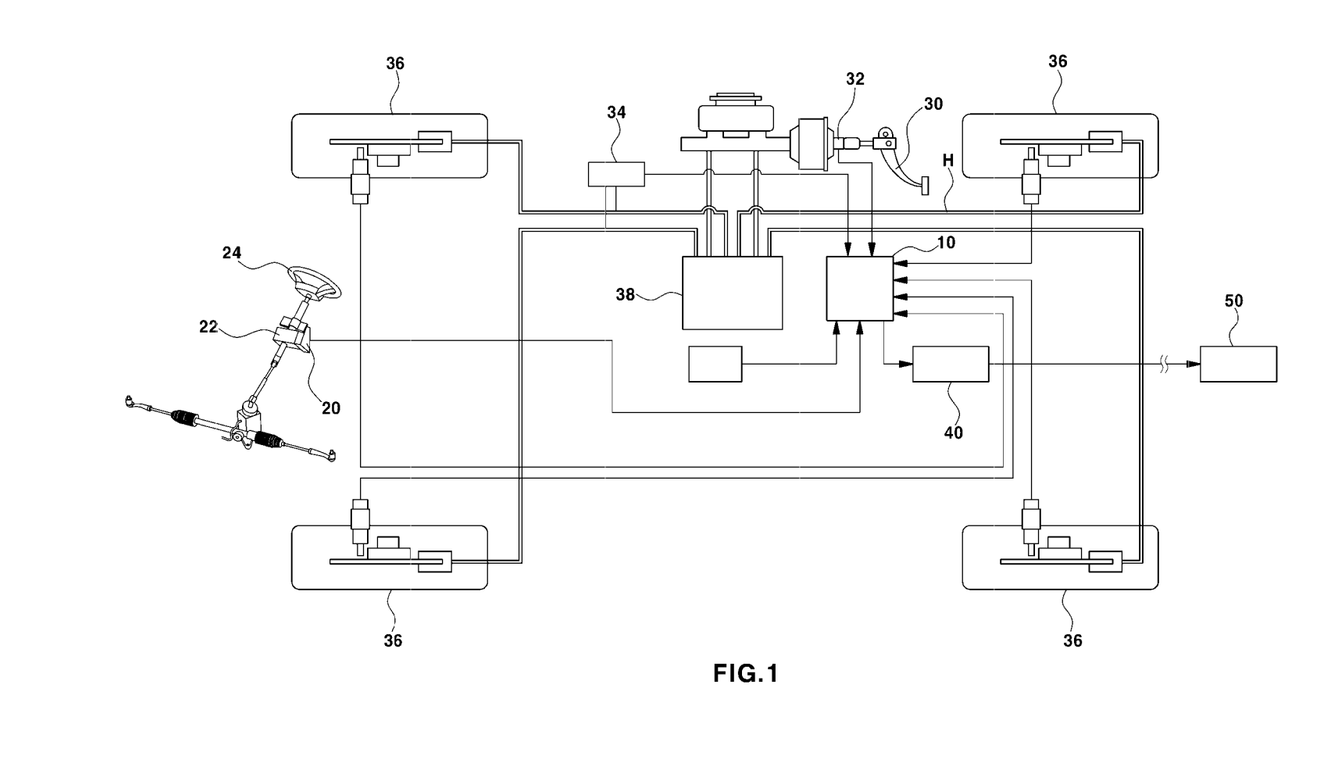
FIG. 1 is a schematic diagram illustrating the configuration of a system for diagnosing a judder detection module according to one exemplary embodiment of the present disclosure.
Figure 2:
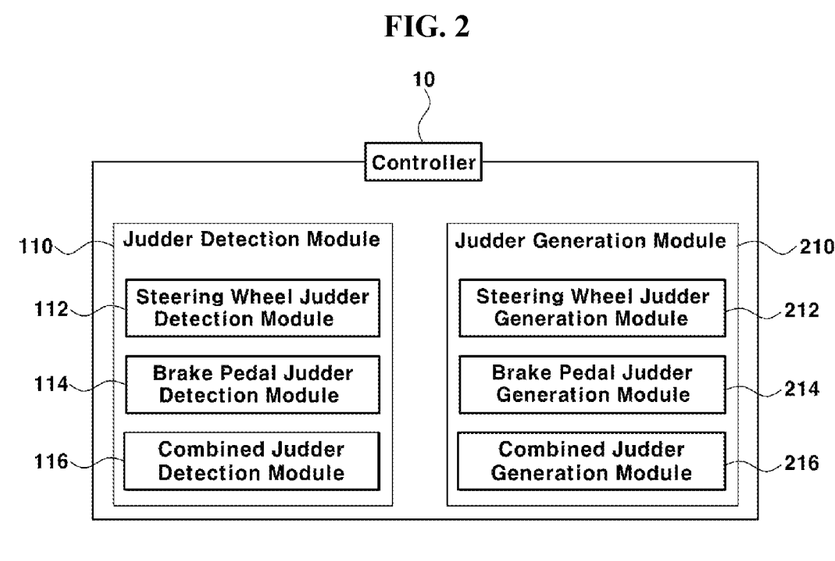
FIG. 2 is a schematic diagram illustrating the configurations of the judder detection module and a judder generation module mounted on the system according to one exemplary embodiment of the present disclosure.

Referring to FIGS. 1 and 2, the system for diagnosing a judder detection module may include a controller 10 that controls the overall operations of a judder detection module 110 and a diagnosis system for the judder detection module 110. According to one exemplary embodiment of the present disclosure, the controller 10 includes the judder detection module 110 configured to execute a judder detection logic and a judder generation module 210 configured to execute a judder generation logic to forcibly generate judder in a vehicle in order to diagnose the operation of the judder detection module 110. According to one exemplary embodiment of the present disclosure, the controller 10 may be implemented as an electronic stability control (ESC) provided in the vehicle or a separate controller.

The controller 10 according to one exemplary embodiment of the present disclosure may be a processor (e.g., computer, microprocessor, CPU, ASIC, circuitry, logic circuits, etc.). The controller 10 may be implemented by a non-transitory memory storing, e.g., a program(s), software instructions reproducing algorithms, etc., which, when executed, performs various functions of the judder detection module 110 and the judder generation module 210, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 10 is configured to communicate with a variety of components provided in the vehicle in order to enable the judder detection module 110 and the judder generation module 210 to operate. More specifically, the controller 10 receives information from, for example, a torque sensor 20 and a power steering motor 22 of a power steering system of the vehicle and a brake pedal 30, a brake pedal switch 32, and a hydraulic pressure sensor 34 of a brake system of the vehicle. In FIG. 1, reference numeral 36 indicates wheels, and reference numeral 38 indicates hydraulic pressure distribution valves.

The torque sensor 20 detects a variation in the steering torque of a steering wheel 24 in order to detect judder in the steering wheel 24 and transmits the detected signal to the controller 10. The controller 10 drives the power steering motor 22 using a torque signal calculated to generate judder in the steering wheel 24.

The brake pedal switch 32 detects the operation of the brake pedal 30 and transmits the detected signal to the controller 10. The hydraulic pressure sensor 34 is configured to detect the amount of hydraulic pressure transferred from a master cylinder to a wheel cylinder upon braking and transmit the detected signal to the controller 10 in order to detect the judder in the brake pedal 30.

The controller 10 is configured to transmit signals to and receive signals from a diagnosis unit 40. The diagnosis unit 40 is configured to communicate with the judder detection module 110, receive inputs of execution conditions for the operation of the diagnosis system, and output results obtained by the diagnosis system. According to one exemplary embodiment of the present disclosure, each of the controller 10 and the diagnosis unit 40 may include a communication module (e.g., a transceiver) which may be a hardware device implemented by various electronic circuits, e.g., processor, to transmit and receive signals via wireless or wired connections.

The controller 10 is also configured to store judder information, detected by the judder detection module 110 during driving of the vehicle, in a storage unit 50 (e.g., a non-transitory memory). The storage unit 50 of a vehicle that has been brought into a repair shop may be connected to the diagnosis unit 40 so that the judder information stored in the storage unit 50 may be reviewed. In addition, the controller 10 may display a result of judder detection, collected in the diagnosis of a stopped vehicle by the judder detection module 110, on the diagnosis unit 40 and store the result of judder detection in any storage location.

Figure 3:
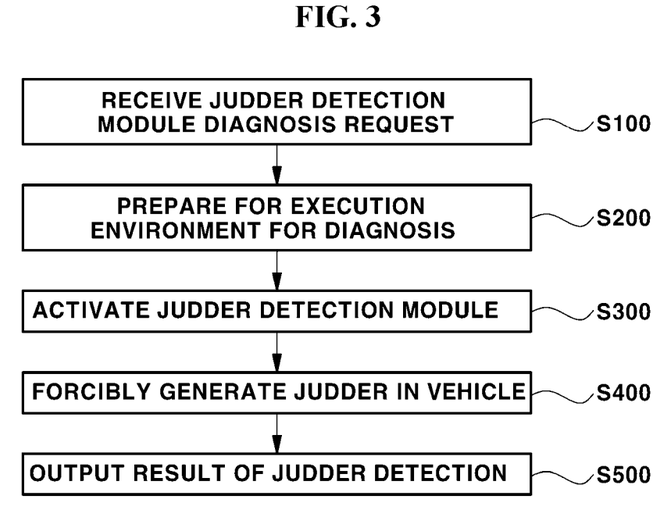
FIG. 3 is a flowchart illustrating a method of diagnosing a judder detection module according to one exemplary embodiment of the present disclosure.

A method of diagnosing a judder detection module using the diagnosis system including the above-described configuration may be generally described with reference to FIG. 3. According to some embodiments of the present disclosure, the controller 10 receives a diagnosis request about whether the judder detection module 110 is operating normally in step S100. The controller 10 may receive the diagnosis request about whether the judder detection module 110 is operating normally from the diagnosis unit 40, i.e., an external connection unit configured to communicate with the controller 10. Afterwards, the controller 10 prepares for an execution environment for the diagnosis in step S200. The execution environment may refer to an environment created by inputting a series of execution conditions for forcibly generating judder. When the execution conditions are input, the controller 10 activates the judder detection module 110 in step S300. The controller 10 forcibly generates the judder in the vehicle by executing the judder generation module 210 in step S400 and outputs a result about whether the judder detection module 110 has detected the judder in step S500.

The judder generation module 210 may be implemented by at least one of forced operation of the power steering system or forced operation of the brake system. According to an embodiment of the present disclosure, the judder generation module 210 may include at least one of a steering wheel judder generation module 212, a brake pedal judder generation module 214, or a combined judder generation module 216.

Figure 4:
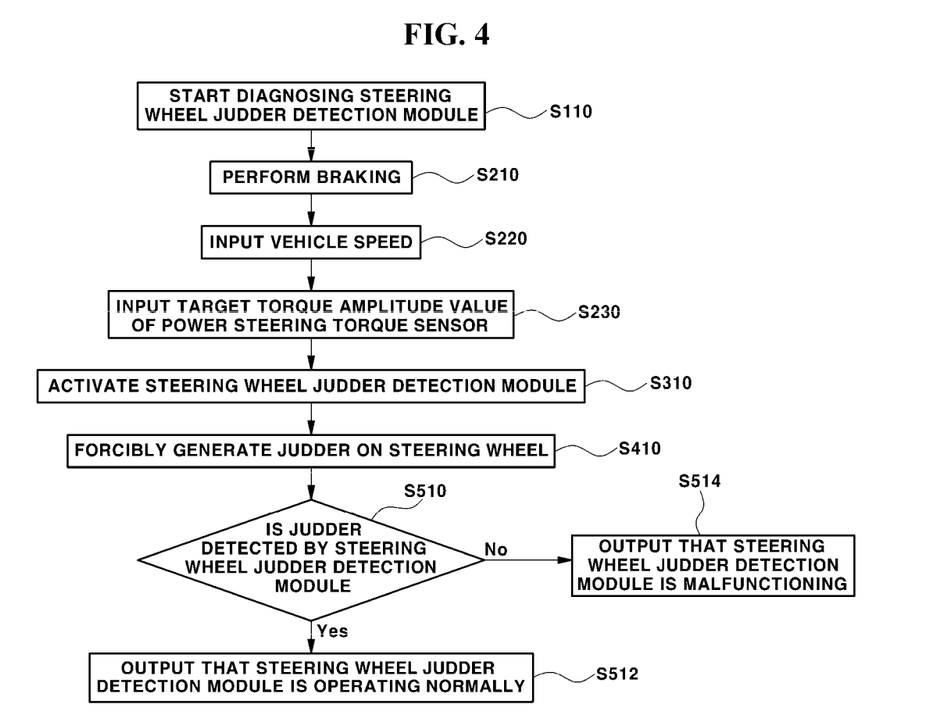
FIG. 4 is a flowchart illustrating a method according to some embodiments of the present disclosure.
Figure 5:
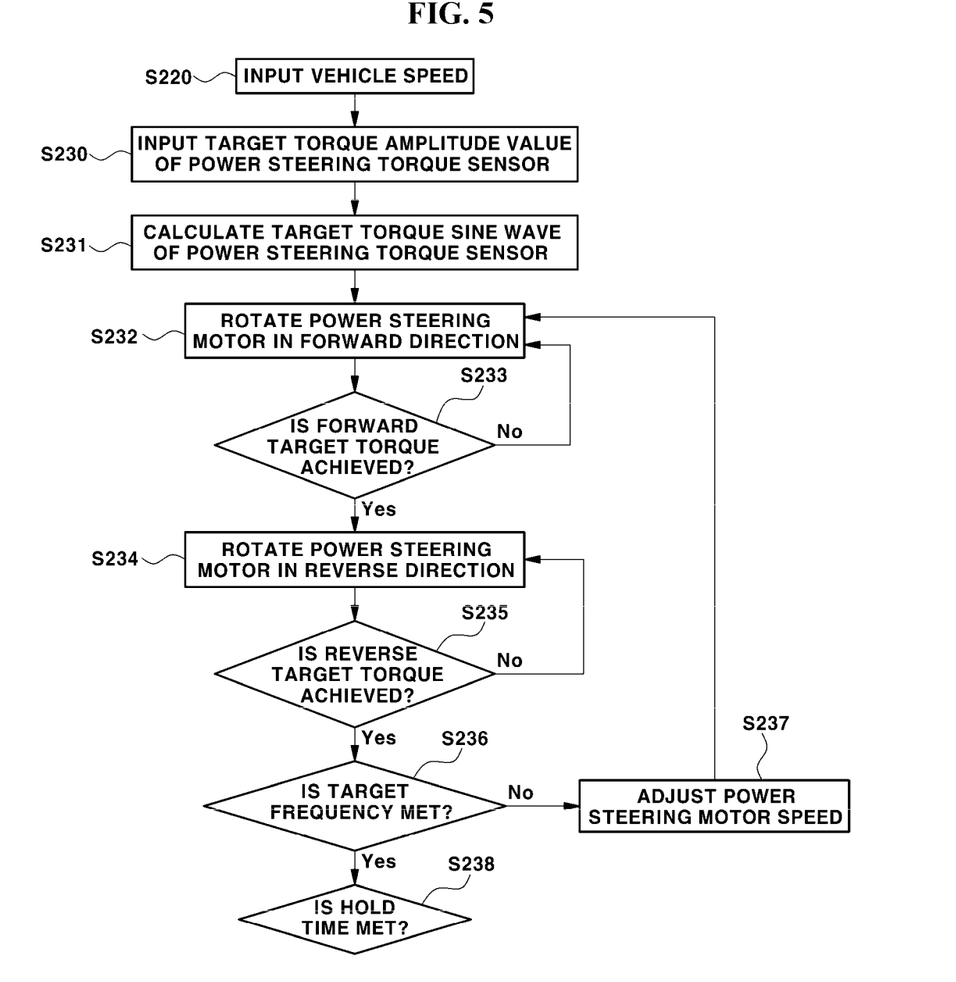
FIG. 5 is a flowchart illustrating the forced generation of a judder on the steering wheel in the process illustrated in FIG. 4.

Hereinafter, a method of diagnosing a judder detection module using the steering wheel judder generation module 212 according to some embodiments of the present disclosure will be described with reference to FIGS. 4 and 5.

When the diagnosis request about whether the judder detection module 110 is operating normally is received by the diagnosis unit 40, the controller 10 starts diagnosing a steering wheel judder detection module 112 in step S110.

As the above-described execution conditions, a test vehicle is brought into a braking situation by pressing the brake pedal 30 in step S210. Since judder in the vehicle generally occurs during braking, the test vehicle may be put in the braking situation. The judder detection module 110 and the judder generation module 210 may be controlled to operate during the braking. In this regard, according to an embodiment of the present disclosure, the controller 10 may determine whether or not the test vehicle is in the braking situation, i.e., the execution environment for diagnosis, on the basis of an ON signal (i.e., a signal output when the brake pedal 30 is pressed) and an OFF signal (i.e., a signal output when the brake pedal 30 is not pressed) from the brake pedal switch 32.

In addition, in step S220, a preset vehicle speed is input as one of the execution conditions. The preset vehicle speed may be a value previously set for the diagnosis of the judder detection module 110 of a vehicle that is stopped rather than driving. For example, the preset vehicle speed is input by the diagnosis unit 40 or is previously set. The preset vehicle speed may be used for calculation of a judder frequency. The judder frequency is calculated on the basis of the vehicle speed. Thus, a judder frequency f may be calculated by Equation 1:

$$F = V/r \tag{1},$$

where V is a preset vehicle speed, and r is a dynamic radius of a tire of the test vehicle.

In step S230, a target torque amplitude value of the torque sensor 20 of the power steering system is input. The target torque amplitude value is a preset torque value, and a target torque sine wave to be supplied to the power steering motor 22 for the forced generation of the judder is obtained using the preset torque value. According to an embodiment of the present disclosure, the target torque amplitude value is greater than a reference on the basis of which the steering wheel judder detection module 112 detects the judder.

Figure 6:
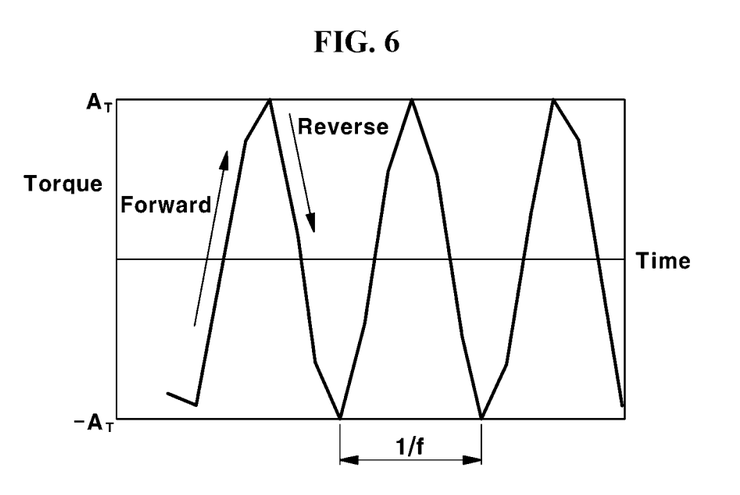
FIG. 6 is a graph illustrating an example torque signal applied to the steering wheel in the process illustrated in FIG. 5.

Afterwards, the controller 10 obtains the target torque sine wave on the basis of the judder frequency f and the target torque amplitude value in S231. As illustrated in FIG. 6, the controller 10 obtains the target torque sine wave having the target torque amplitude value ($+A_T$, $-A_T$) and the judder frequency f.

When the target torque sine wave is obtained, the controller 10 activates the steering wheel judder detection module 112 in step S310. When the steering wheel judder detection module 112 is activated, the controller 10 forcibly generates judder in the steering wheel. That is, the controller 10 drives the power steering motor 22 so that the power steering motor 22 operates on the target torque sine wave. Clockwise or counterclockwise torque is generated on the steering wheel 24 by driving the power steering motor 22 in the forward or reverse direction, thereby generating clockwise or counterclockwise vibration.

The controller 10 rotates the power steering motor 22 in the forward direction by applying the target torque sine wave in step S232 and determines whether a forward target torque has been achieved in step S233. The forward target torque may be a value obtained by adding an amplitude value to an initial torque value. The controller 10 determines whether or not a real-time torque value has reached the forward target torque.

When the real-time torque value has reached the forward target torque, the controller 10 drives the power steering motor 22 in the reverse direction in step S234 and determines whether a reverse target torque has been achieved in step S235. The reverse target torque is a value obtained by deducting the amplitude $A_T$ from the initial torque value.

When the real-time torque value is equal to or greater than the reverse target torque, the controller 10 determines whether the frequency of the sine wave that is being currently applied meets a target frequency or the judder frequency in step S236.

When the target frequency is not met, the controller 10 adjusts the operating speed of the power steering motor 22 in steps S237. The power steering motor 22 is operated again through a series of steps S232 to S236, and these steps are repeated until the target frequency is met.

When the target frequency is met, the controller 10 determines whether or not a preset hold time is met in step S238. Whether judder has been generated in the steering wheel 24 by operating the power steering motor 22 for the preset hold time is determined. As a non-limiting example, the hold time may be in the range of from 3 to 5 seconds.

In steps S410 and S510, the controller 10 determines whether the judder forcibly generated by the steering wheel 24 as in the steps S232 to S238 is detected by the steering wheel judder detection module 112. When the steering wheel judder detection module 112 has detected the judder, the controller 10 notifies the diagnosis unit 40 that the steering wheel judder detection module 112 is operating normally in step S512. When the steering wheel judder detection module 112 has failed to detect the judder, the controller 10 notifies the diagnosis unit 40 that the steering wheel judder detection module 112 or the judder detection module 110 is malfunctioning in step S514.

Figure 7:
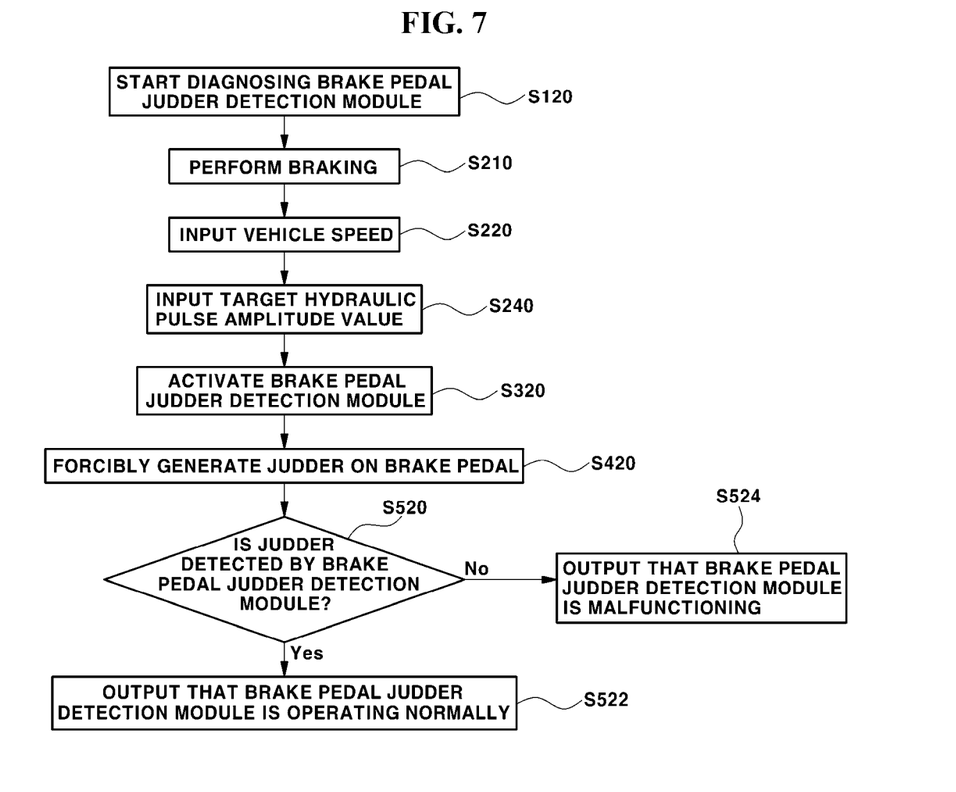
FIG. 7 is a flowchart illustrating a method according to some embodiments of the present disclosure.
Figure 8:
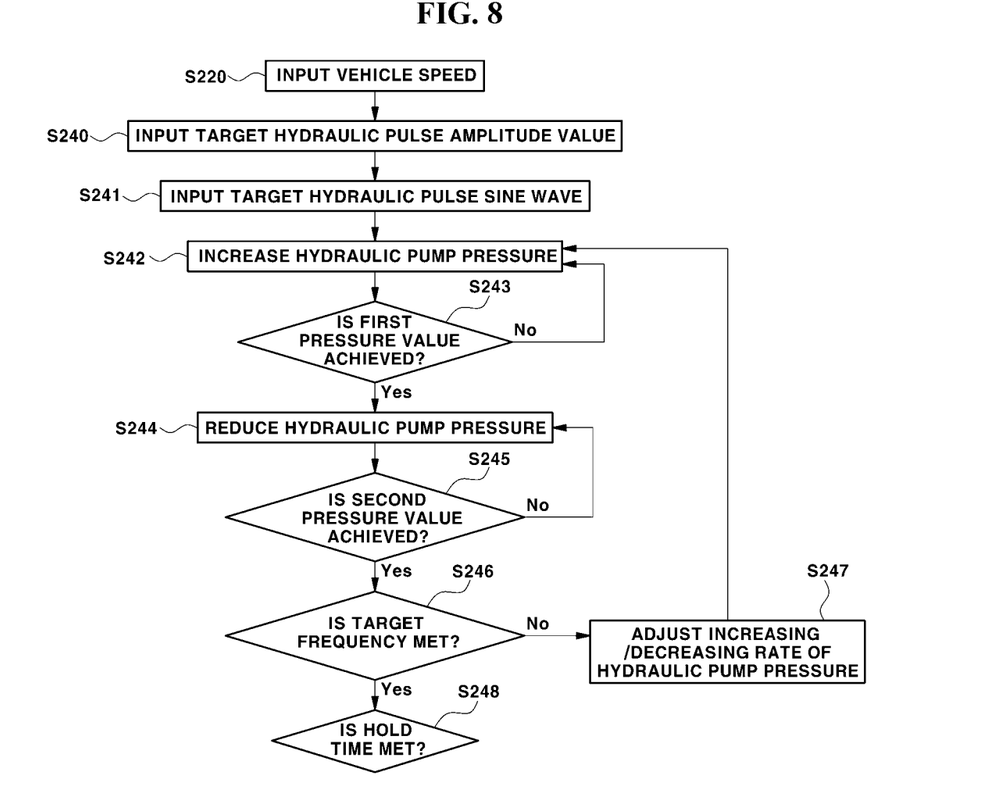
FIG. 8 is a flowchart illustrating the forced generation of a judder on the brake in the process illustrated in FIG. 7.

Hereinafter, a method of diagnosing a judder detection module using the brake pedal judder generation module 214 according to some embodiments of the present disclosure will be described with reference to FIGS. 7 and 8.

In step S120, when the diagnosis unit 40 receives a diagnosis request from a brake pedal judder detection module 114, the controller 10 starts diagnosing the brake pedal judder detection module 114.

As the above-described execution conditions, a test vehicle is brought into a braking situation by pressing the brake pedal 30 in step S210. Since judder in the vehicle generally occurs during braking, the test vehicle may be placed in the braking situation. The judder detection module 110 and the judder generation module 210 may be controlled to operate during the braking. Whether the braking has been performed may be determined on the basis of a signal from the brake pedal switch 32 as described above.

In addition, in step S220, a preset vehicle speed is input as one of the execution conditions. The preset vehicle speed may be a value previously set for the diagnosis of the judder detection module 110 of a vehicle that is stopped rather than driving. For example, the preset vehicle speed is input by the diagnosis unit 40 or is previously set. The preset vehicle speed may be used for calculation of a judder frequency. The judder frequency is calculated on the basis of the vehicle speed. Thus, a judder frequency f may be calculated by Equation 1 above.

In step S240, a target amplitude value of a hydraulic pulse to be forcibly supplied to a hydraulic line H of the brake system is input. The target amplitude value of the hydraulic pulse is a preset threshold value of a brake hydraulic amplitude. A target amplitude sine wave of the hydraulic pulse to be supplied to the hydraulic line H is obtained on the basis of the target amplitude value. According to an embodiment of the present disclosure, the target amplitude value of the hydraulic pulse is greater than a reference on the basis of which the brake pedal judder detection module 114 detects the judder.

Figure 9:
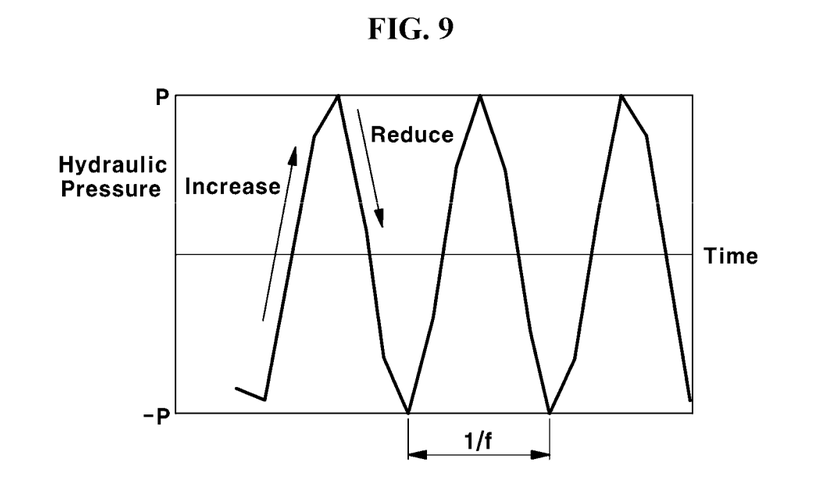
FIG. 9 is a graph illustrating an example hydraulic signal applied to the brake in the process illustrated in FIG. 8.

Afterwards, in step S241, the controller 10 obtains the target amplitude sine wave of the hydraulic pulse on the basis of the judder frequency f and the target amplitude value of the hydraulic pulse. As illustrated in FIG. 9, the controller 10 obtains the target amplitude sine wave of the hydraulic pulse having the target amplitude value of the hydraulic pulse (+P, −P) and the judder frequency f. The controller 10 repeatedly increases or decreases the hydraulic pressure in the hydraulic line H using a hydraulic pump and a valve of the brake system so that a hydraulic pulse compliant with the target amplitude sine wave of the hydraulic pulse having the judder frequency f and the target amplitude value of the hydraulic pulse is generated. In this case, the hydraulic pulse generated in the hydraulic line H by the controller 10 is transferred to a master cylinder and vibration occurs in the brake pedal 30.

When the target amplitude sine wave of the hydraulic pulse is obtained, the controller 10 activates the brake pedal judder detection module 114 in step S320. When the brake pedal judder detection module 114 is activated, the controller 10 forcibly generates judder in the brake pedal 30 in step S420. That is, a hydraulic pulse corresponding to the target amplitude sine wave of the hydraulic pulse is generated, and the judder is reproduced in the brake pedal 30 through the master cylinder.

The controller 10 increases the hydraulic pressure in the hydraulic line by adjusting the hydraulic pump of the brake system in accordance with the target amplitude sine wave of the hydraulic pulse in step S242. Here, the controller 10 determines whether or not the hydraulic pressure in the hydraulic line has become a first pressure value, i.e., a target high pressure, in step S243. The first pressure value is obtained by adding the initial hydraulic pressure and the amplitude, and the controller 10 determines whether a real-time hydraulic pressure has become the first pressure value by comparison during the increasing of the hydraulic pressure.

When the real-time hydraulic pressure has become the first pressure value, the controller 10 decreases the hydraulic pressure in the hydraulic line H in accordance with the target amplitude sine wave of the hydraulic pulse in step S244. Then the controller 10 monitors whether the hydraulic pressure in the hydraulic line H has become a second pressure value, i.e., a target low pressure, in step S245. The second pressure value is obtained by deducting the amplitude from the initial hydraulic value. The controller 10 determines whether the real-time hydraulic pressure has become the second pressure value by comparison during the decreasing of the hydraulic pressure.

When the real-time hydraulic pressure has become the second pressure value, the controller 10 determines whether the frequency of the sine wave that is being applied meets the target frequency or the judder frequency in step S246. When the target frequency is not met, the controller 10 adjusts the increasing or decreasing rate of the hydraulic pressure by adjusting an operating current, a driving rate, and the like of the hydraulic pump and the valve of the brake system in step S247. The hydraulic pump is driven again through a series of steps S242 to S246, and these steps are repeated until the target frequency is met.

When the target frequency is met, the controller 10 determines whether or not a preset hold time is met in step S248. Whether judder has been generated in the brake pedal by operating the hydraulic pump for the preset hold time is determined. As a non-limiting example, the hold time may be in the range of from 3 to 5 seconds.

In step S520, the controller 10 determines whether the judder forcibly generated by the brake pedal 30 as in the steps S242 to S248 is detected by the brake pedal judder detection module 114. When the brake pedal judder detection module 114 has detected the judder, the controller 10 notifies the diagnosis unit 40 that the brake pedal judder detection module 114 is operating normally in step S512. When the brake pedal judder detection module 114 has failed to detect the judder, the controller 10 notifies the diagnosis unit 40 that the brake pedal judder detection module 114 or the judder detection module 110 is malfunctioning in step S524.

Figure 10:
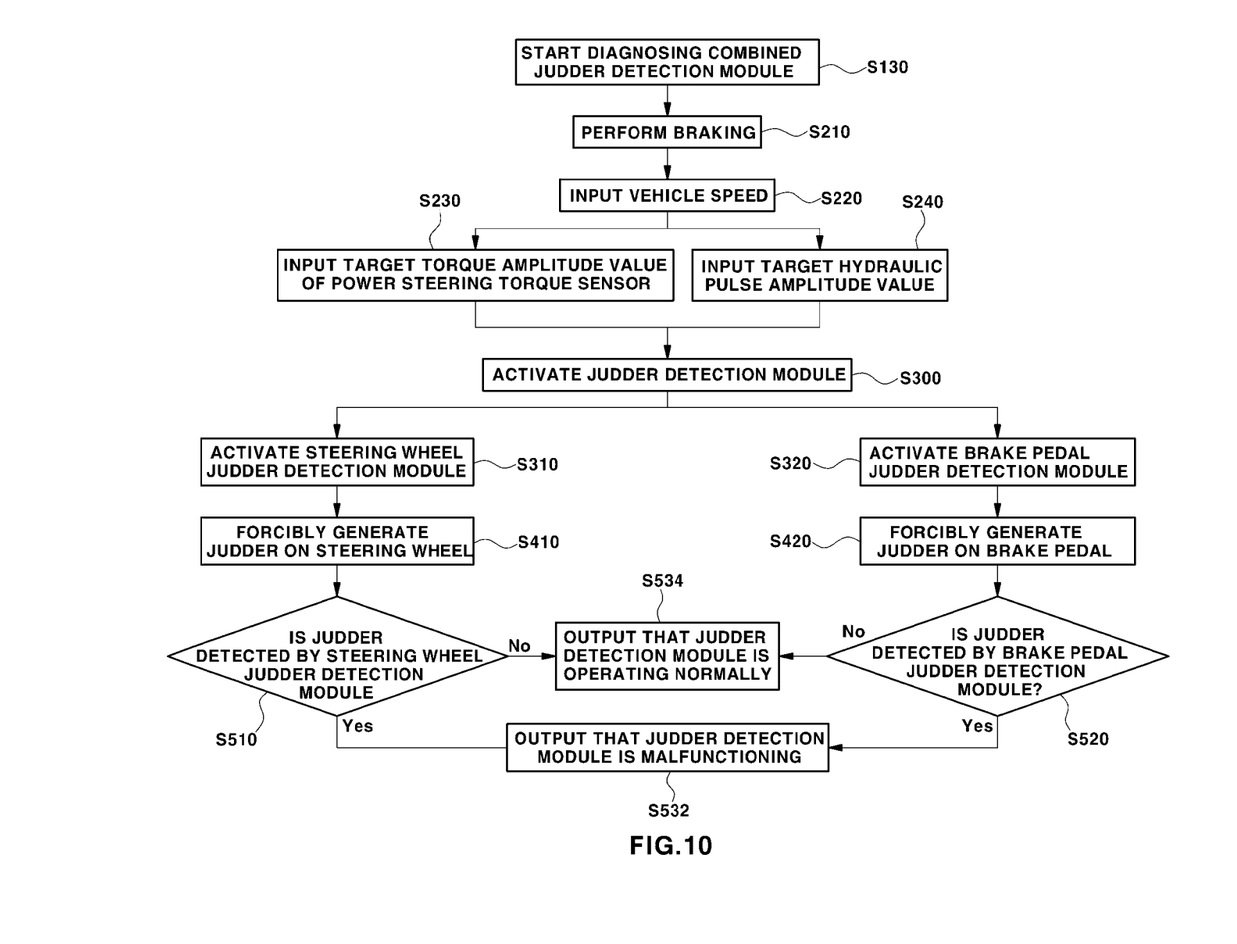
FIG. 10 is a flowchart illustrating a method according to some embodiments of the present disclosure.

Hereinafter, a method of diagnosing a judder detection module using the combined judder generation module 216 according to some embodiments of the present disclosure will be described with reference to FIG. 10.

In step S130, the controller 10 starts diagnosing a combined judder detection module 116. When a request requesting that the combined judder detection module 116 be diagnosed is received, the controller 10 starts diagnosing the combined judder detection module 116. In particular, in the method of diagnosing the combined judder detection module 116, the method of diagnosing the steering wheel judder detection module 112 and the method of diagnosing the brake pedal judder detection module 114 may be used in a combination.

In the same manner as in the method of diagnosing the steering wheel judder detection module 112 and the method of diagnosing the brake pedal judder detection module 114, a test vehicle is brought into a braking situation in step S210, and a preset vehicle speed is input in step S220. A judder frequency f is calculated by Equation 1 above.

A target torque amplitude value of the power steering torque sensor 20 is input in step S230, and a target amplitude value of a hydraulic pulse is input in step S240. However, these values are different from the values input when the steering wheel judder detection module and the brake pedal judder detection module are diagnosed separately.

In step S300, the judder detection module is activated, and the controller 10 activates the steering wheel judder detection module 112 and the brake pedal judder detection module 114 in steps S310 and S320. As described above, the steering wheel judder generation module 212 and the brake pedal judder generation module 214 are controlled to operate by adjusting a steering torque value and a brake hydraulic pressure in steps S410 and S420.

The controller 10 determines whether the steering wheel judder detection module 112 detects judder in step S510 and, at the same time, determines whether or not the brake pedal judder detection module 114 detects judder in step S520. When no judder is detected from at least one of the two judder detection modules, the controller 10 notifies the diagnosis unit 40 that the judder detection module 110 is malfunctioning in step S534. In contrast, when both the steering wheel judder detection module 112 and the brake pedal judder detection module 114 are detecting judders, the controller 10 notifies the diagnosis unit 40 that the judder detection module 110 is operating normally in step S532.

Figure 11:
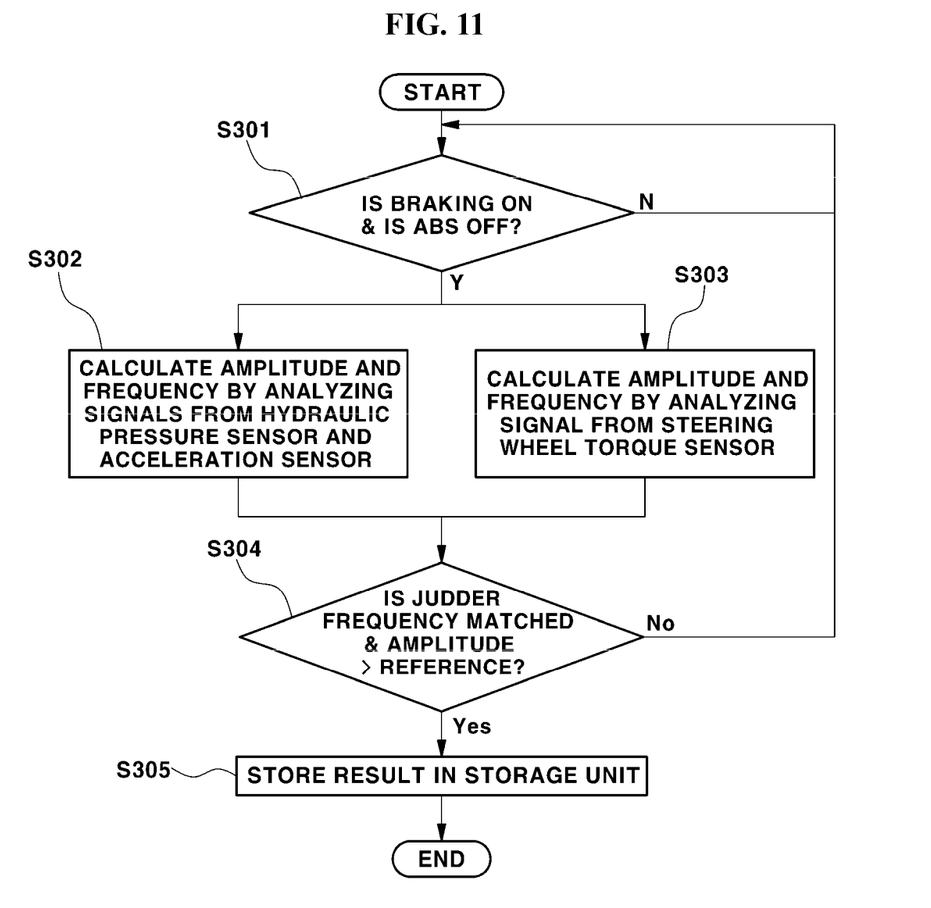
FIG. 11 is a flowchart illustrating the operation of the judder detection module according to some embodiments of the present disclosure.

Hereinafter, an exemplary judder detection operation of the activated judder detection module 110 in the step S300 will be described.

FIG. 11 is a flowchart illustrating the detection operation of the activated judder detection module. In step S301, the controller 10 determines whether a braking function is on, and the anti-lock braking system (ABS) is non-activated. The controller 10 reviews an ON signal from the brake pedal switch 32 and an ABS OFF signal. Since judder inevitably occurs when the ABS operates, the judder detection module 110 may not be operated during the ABS operation, thereby increasing the accuracy of the judder detection. When the controller 10 receives the ON signal from the brake pedal switch 32 and the ABS OFF signal, the controller 10 controls the judder detection module 110 to operate.

The controller 10 receives signals from sensors detecting brake pedal judder, steering wheel judder, and a combination thereof and calculates the amplitude and the frequency of each of the received signals by analyzing the received signals in steps S302 and S303.

In other words, the controller 10 calculates amplitudes and frequencies of a detection signal (i.e., a signal detecting the amount of hydraulic pressure transferred from the master cylinder to the wheel cylinder at the time of braking) of the hydraulic pressure sensor 34 used to detect judder in the brake pedal 30 and a detection signal (i.e., a signal detecting a change in the steering torque of the steering wheel 24) of the power steering torque sensor 20 used to detect judder in the steering wheel 24.

The controller 10 determines whether judders have occurred on the basis of the calculated amplitudes and frequencies of the signals. In this regard, in step S304, the controller 10 determines whether the frequency of each of the signals, calculated in the steps S302 and S303, is the same as the judder frequency f and, at the same time, compares the amplitude of each of the signals, calculated in the steps S302 and S303, with a reference.

When the frequency of each of the signals, calculated in the steps S302 and S303, is the same as the judder frequency f and the amplitude of each of the signals, calculated in the steps S302 and S303, is greater than the reference, the controller 10 may determine that judders are occurring.

The controller 10 stores the results of the determination and comparison in the storage unit 50.

Specifically, when the frequency calculated from the detection signal of the hydraulic pressure sensor 34 is the same as the judder frequency and the amplitude calculated from the detection signal of the hydraulic pressure sensor 34 is greater than the reference, it may be regarded that brake pedal judder has occurred. In addition, when the frequency calculated from the detection signal of the power steering torque sensor 20 is the same as the judder frequency and the amplitude calculated from the detection signal of the power steering torque sensor 20 is greater than the reference, it may be regarded that steering wheel judder has occurred.

That is, when a signal having the judder frequency f and the preset amplitude is forcibly input through the judder generation module 210, it is possible to detect the occurrence of judder through the above-described steps S302 to S305 when the judder detection module 110 is operating normally.

According to one exemplary embodiment of the present disclosure, it is possible to determine whether or not the judder detection module mounted on the vehicle is operating normally. Specifically, it is possible to perform the determining operation in a situation in which the vehicle is stopped. Accordingly, in particular, it is possible to determine whether or not a judder detection logic is operating normally by forcibly reproducing actual judder conditions in a new vehicle, thereby enabling a quality test to be performed on the new vehicle.

According to one exemplary embodiment of the present disclosure, when a judder test is performed on a vehicle, a highly reliable test result may be provided to the owner of the vehicle.

The present disclosure set forth hereinabove is not limited to the foregoing embodiments or the accompanying drawings. It will be apparent to a person having ordinary skill in the art that various substitutions, modifications, and alterations are possible without departing from the technical ideal of the present disclosure.

What is claimed is:

1. A method of diagnosing a judder detection module of a vehicle, the method comprising:
receiving a diagnosis request requesting that the judder detection module of the vehicle be diagnosed;
preparing for an execution environment for diagnosis of the judder detection module;
activating the judder detection module;
forcibly generating judder in the vehicle, wherein the forcibly generating judder includes:
operating a power steering motor of a steering wheel of the vehicle, wherein the power steering motor is rotated until torque of the power steering motor reaches a first target torque in a first direction and the power steering motor is rotated until the torque of the power steering motor reaches a second target torque in a second direction, the first direction being opposite to the second direction, and
adjusting a hydraulic pressure applied to a brake of the vehicle, wherein a hydraulic pulse is applied until the hydraulic pressure reaches a predetermined target high-pressure value or a first pressure and the hydraulic pulse is applied until the hydraulic pressure reaches a predetermined target low-pressure value or a second pressure; and
determining whether the judder detection module operates.

2. The method according to claim 1, wherein, in the execution environment, a braking operation is performed in the vehicle, and a preset vehicle speed is input.

3. The method according to claim 2, wherein the forcibly generating judder comprises:
obtaining a sine wave signal periodically changing over time in accordance with the vehicle speed and a preset amplitude of the sine wave signal; and
applying the sine wave signal to the vehicle for a preset period of time.

4. The method according to claim 1, wherein the forcibly generating judder includes generating the judder in at least one of a brake pedal or the steering wheel of the vehicle.

5. The method according to claim 2, wherein the judder is forcibly generated on the steering wheel of the vehicle.

6. The method according to claim 5, wherein the driving the power steering motor of the steering wheel comprises:
calculating a judder frequency in accordance with the vehicle speed;
calculating a sine wave signal of the first target torque and the second target torque from the judder frequency and a preset amplitude value of the first and second torques of the motor; and
forcibly driving the motor in compliance with the sine wave signal.

7. The method according to claim 2, wherein the judder is forcibly generated on a brake pedal of the vehicle.

8. The method according to claim 7, wherein the adjusting a hydraulic pressure comprises:
calculating a judder frequency in accordance with the vehicle speed;
calculating a sine wave signal of a target hydraulic pulse from the judder frequency and a preset target amplitude value of the hydraulic pulse of a hydraulic pump supplying the hydraulic pressure to the brake; and
forcibly driving the hydraulic pump in compliance with the sine wave signal.

9. The method according to claim 2, wherein the judder is forcibly generated on a brake pedal and the steering wheel of the vehicle.

10. The method according to claim 9, wherein the forcibly generating judder further comprises:
calculating a judder frequency in accordance with the vehicle speed;
calculating a first sine wave signal of the first and second target torques from the judder frequency and a preset amplitude value of the first and second target torques of the power steering motor and calculating a second sine wave signal of a target hydraulic pulse from the judder frequency and a preset target amplitude value of the hydraulic pulse of a hydraulic pump supplying the hydraulic pressure to the brake; and
forcibly driving the power steering motor in compliance with the first sine wave signal of the first and second target torques and forcibly driving the hydraulic pump in compliance with the second sine wave signal of the target hydraulic pulse.

11. The method according to claim 1, further comprising, when the judder detection module detects the forcibly-generated judder, displaying that the judder detection module is operating normally.

12. The method according to claim 1, further comprising, when the judder detection module fails to detect the forcibly-generated judder, displaying that the judder detection module is malfunctioning.

* * * * *